United States Patent [19]

Schmitt

[11] Patent Number: 4,539,065
[45] Date of Patent: Sep. 3, 1985

[54] APPLICATION OF SURFACING SHEETS TO SUPPORT MEMBERS THEREFOR

[76] Inventor: Karl-Heinz Schmitt, 122 Pretoria Rd., Rynfield, Benoni Tvl. Province, South Africa

[21] Appl. No.: 608,095

[22] Filed: May 8, 1984

[30] Foreign Application Priority Data

May 9, 1983 [ZA] South Africa ............ 83/3280

[51] Int. Cl.³ ............................................. B29C 17/00
[52] U.S. Cl. .................................... 156/475; 156/216; 156/486; 156/492
[58] Field of Search ............... 156/216, 486, 492, 488, 156/443, 468, 475, 478–482, 499

[56] References Cited

U.S. PATENT DOCUMENTS 4,035,224  7/1977  Anderson ................. 156/216 X

FOREIGN PATENT DOCUMENTS 2528292  1/1977  Fed. Rep. of Germany ...... 156/479

Primary Examiner—David Simmons
Attorney, Agent, or Firm—Finnegan, Henderson, Farabow, Garrett & Dunner

[57] ABSTRACT

Apparatus for applying a surfacing sheet such as a plastic sheet, veneer or the like to an optionally radiused edge of a panel, or to a column or the like, in which an applicator bar which is, optionally heated and is preferably flat, is urged against the surfacing sheet to press it onto the surface of the panel column or the like. Means are provided for ensuring that lateral movement of the applicator bar takes place relative to the panel or column to stretch and smooth the surfacing sheet onto the surface of the panel or column. The applicator bar is preferably carried on an arm arrangement held between two spaced rotatable end supports and the biasing is carried out by a number of spaced pneumatic or hydraulic piston and cylinder assemblies acting transverse to the arm arrangement. The biasing means is preferably carried on a frame member carried by the rotatable end supports.

8 Claims, 9 Drawing Figures

APPLICATION OF SURFACING SHEETS TO SUPPORT MEMBERS THEREFOR

FIELD OF INVENTION

This invention relates to the application of surfacing sheets to support members such as panels, columns and the like and, more particularly, but not exclusively, to panels of the nature of a door or a desk top.

Numerous different sheet materials are desirably secured to the surfaces of doors, desk tops or other panels or columns with the object of providing a pleasing and durable appearance. In particular, but without detracting from the scope of this invention, the application of hard wearing attractive plastic sheets to the surfaces of carrier members, for example made of composition board or chip board, block board or the like, is highly desirable.

In other instances where the surfacing sheet is simply selected to provide an aesthetically pleasing appearance, such as in the case of wood veneers, heat activated adhesives are often pre-applied to the surfacing sheet so that they can be secured to the substrata with the aid of heat and pressure. In some other cases heat is not even necessary.

It is the object of this invention to provide apparatus which will enable the above described operation, whether or not heating is required, to be carried out more effectively and in a manner in which the sheet material is applied more positively to the surface of a carrier member around a usually, but not necessarily radiused corner or edge.

BRIEF SUMMARY OF THE INVENTION

In accordance with this invention there is provided apparatus for applying sheet material around an edge or corner of a carrier member, said apparatus comprising a frame, a support arrangement for the carrier member for supporting it in a roughly predetermined position, an applicator bar associated with the frame and extending along the required length of the support arrangement, means for urging the applicator bar towards the surface of a carrier member supported in the apparatus, means for causing simultaneous lateral movement of the applicator bar relative to said surface while in contact therewith; and lateral restraining means for inhibiting uncontrolled or undesired lateral movement of the applicator bar.

Further features of the invention provide for the applicator bar to be flat and to embody heating means for selectively heating the bar when required; for the applicator bar and lateral restraining means associated therewith to be carried on rotatable end supports rotatable in unison and supporting therebetween frame members for mounting the urging means and lateral restraining means for the applicator bar; for the support arrangement to be movable relative to the applicator bar either by providing a table and clamp arrangement movable relative to the applicator bar or, alternatively, by providing end supports in the form of rotatable mounting assemblies optionally movable laterally relative to the applicator bar; and for the apparatus to include a jig member for locating an edging strip relative to a panel so that a surfacing sheet is adhered to the major surface of both the panel and the edging strip prior to the sheet being rotated around radiused edges to the panel and the edging strip with the surfacing sheet being simultaneously and automatically adhesively secured to the radiused edges of the panel itself and that of the edging strip.

Preferably, and for the most common use of the apparatus, a pair of rotatable end supports carry between them a pair of laterally spaced parallel primary frame members with a plurality of spaced urging means carried by one of such primary frame members. The urging means preferably assume the form of pneumatic or hydraulic piston and cylinder assemblies. The axes of such piston and cylinder assemblies are preferably at roughly right angles to the plane in which the applicator bar is to operate and the lateral restraining means, which may be in the form of pivotally mounted arms or plates, may be hinged to the other frame member. The urging means can act directly on the applicator bar or on the arms or plates forming the lateral restraining means. Preferably the arms or plates defining the lateral restraining means are at roughtly right angles to the axes of the piston and cylinder assemblies (i.e. parallel to the surface of the carrier member being engaged at any time by the applicator bar). The applicator bar is hingedly connected to the member carrying same to provide for limited free movement so that it can assume an operative position according to its contact with a surface.

Where the surfacing sheet can be susceptible to damage of any sort as a result of lateral sliding of the applicator bar thereon, an interposed protective, but usually heat conductive sheet, may be interposed between the applicator bar and the surfacing sheet. Sheets such as veneers may require this type of protection.

In all cases the motion of the applicator bar provided by apparatus of this invention relative to the surfacing sheet is one in which the applicator bar tends to pull and smooth the surfacing sheet in a taught condition onto the surface with a sliding motion. In some cases the edges or carrier being surfaced may be sharp (e.g. where veneer is employed as the surface sheet) but generally it will be radiused.

BRIEF DESCRIPTION OF THE DRAWINGS

In order that the invention may be more fully understood one embodiment thereof will now be described with reference to the accompanying drawings in which.

Figure 1:
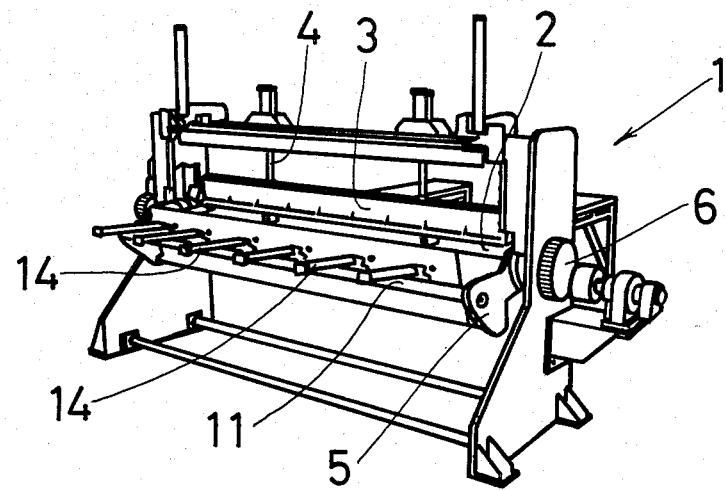
FIG. 1 is an isometric schematic view of apparatus according to this invention.
Figure 2:
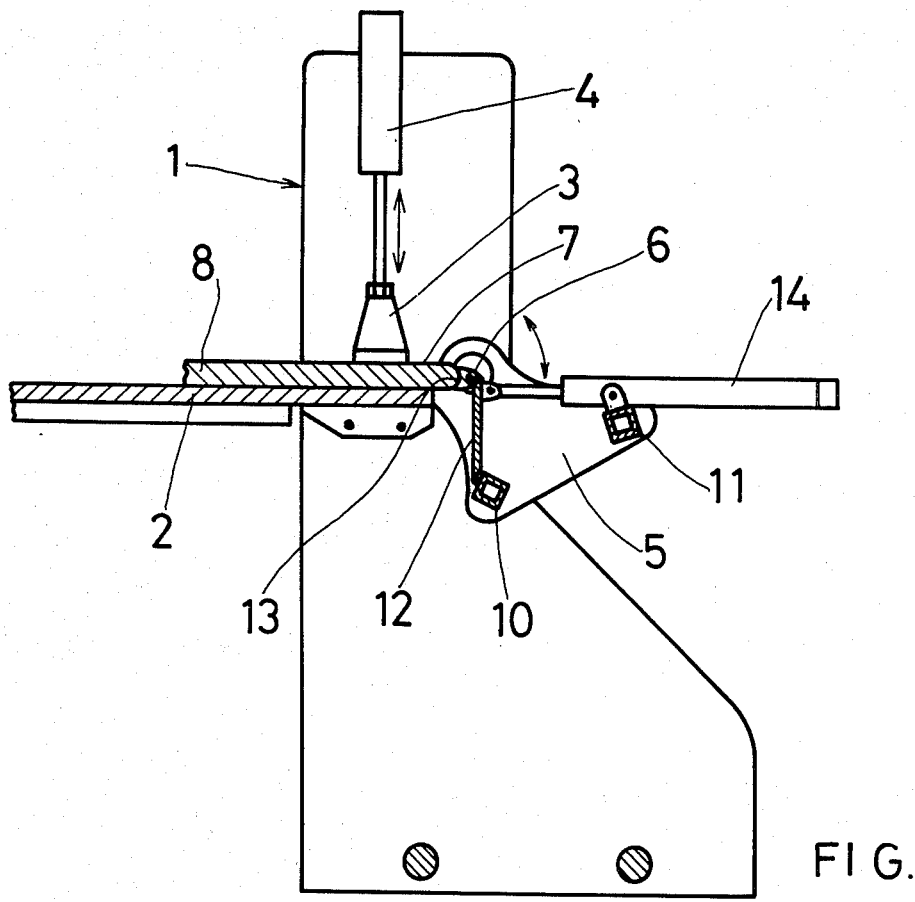
FIG. 2 is a schematic end elevation thereof.
Figure 3:
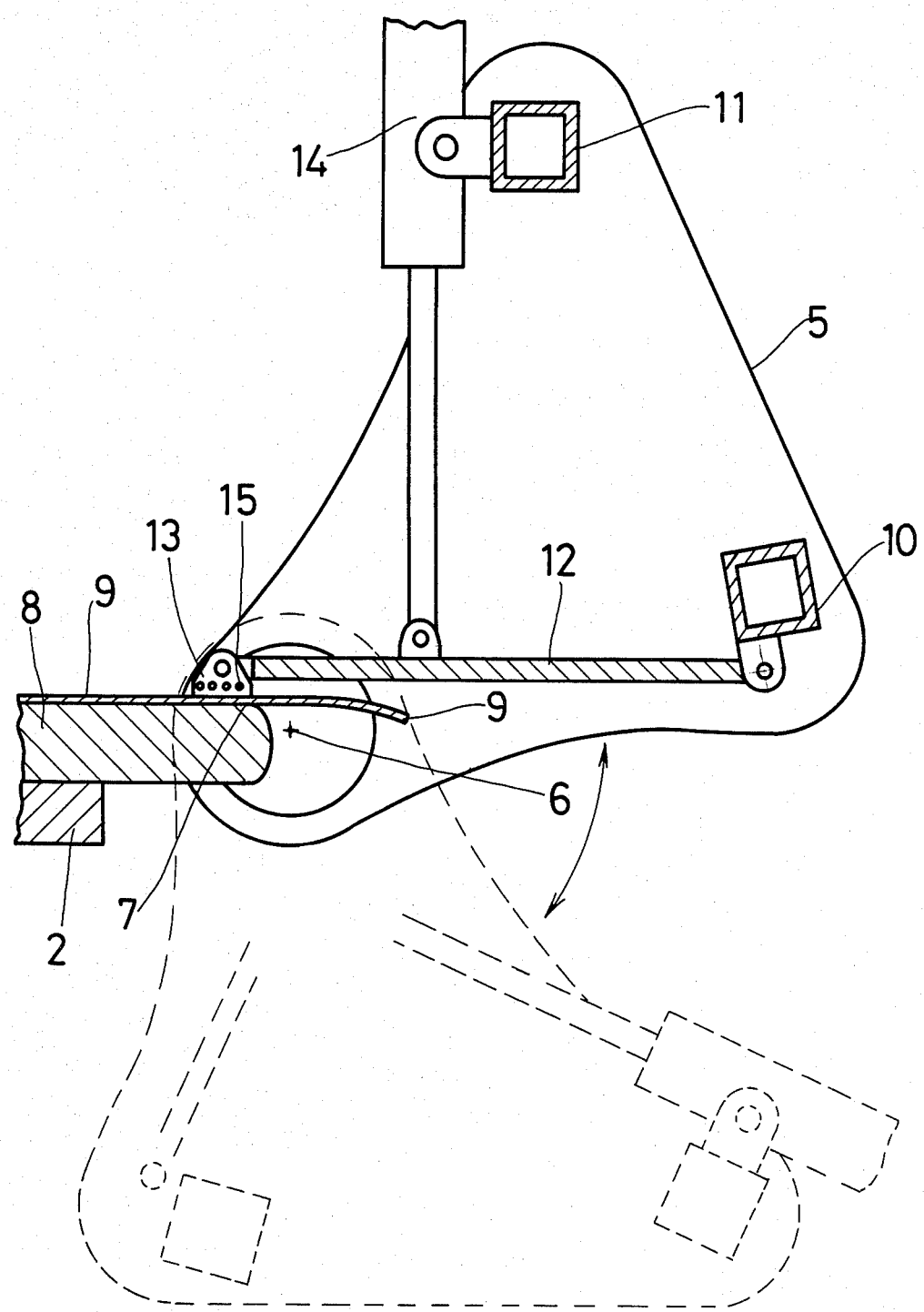
FIG. 3 is a schematic end elevation showing only the applicator bar and its mounting arrangement with a second position thereof being illustrated in dotted lines.

In the embodiment of the invention illustrated in FIGS. 1 to 5 (FIGS. 4 and 5 merely including modifications) the apparatus comprises a support frame, generally indicated by numeral 1, which supports a table 2 and co-operating clamp assembly 3 for clamping panels or doors to the table. The clamp assembly is preferably operated by a plurality of spaced pneumatic or hydraulic piston and cylinder assemblies 4.

A pair of end supports 5 are rotatable about an axis 6 which is located, in operation, in the vicinity of the corner 7 of a projecting end of a panel 8 to be covered with a sheet material 9. The edge of the panel is radiused, as indicated above, but by using the apparatus of this invention, the radius of curvature can be as little as 8 mm for the sheet material employed as a cover and which is the same as has been used heretofore with a minimum radius of curvature of 16 mm. The advantage here, as will become more clear from the following, is attained by the fact that contact heat is employed and the heat is applied to the region of the sheet where it is necessary in order to achieve a bending thereof. In the prior art, as mentioned above, the sheet was initially heated using infra red radiation which was removed prior to the bending operation taking place. This provided time for it to cool appreciably as described.

The end supports carry between them a pair of longitudinally extending beams 10 and 11 the one of which is angularly offset from the other relative to the axis of rotation of the end supports. The one support beam 10 has pivotally attached thereto an arm arrangement 12 which is conveniently in the form of a continuous metal plate and which extends inwardly towards a region in which the projecting edge of a panel will be in use. This assembly carries at its free end a hingedly mounted, substantially flat applicator bar 13 extending along the length of the apparatus.

A row of pneumatic piston and cylinders 14 is mounted to the other support beam 11 which is orientated such that the pneumatic piston and cylinder assemblies can be employed for urging the free ends of the arm arrangement, and thus the applicator bar 13, towards a projecting end of a panel or the like clamped to the table in use.

The applicator bar is, in this embodiment of the invention, provided with a resistance heating element 15 therein so that its temperature can be controlled to a temperature at which the surfacing sheets are not damaged but are, nevertheless, rendered sufficiently pliable to bend them around a radiused end of a panel or door. As indicated above the contact heat is highly desirable and provides extremely advantageous results.

Figure 4:
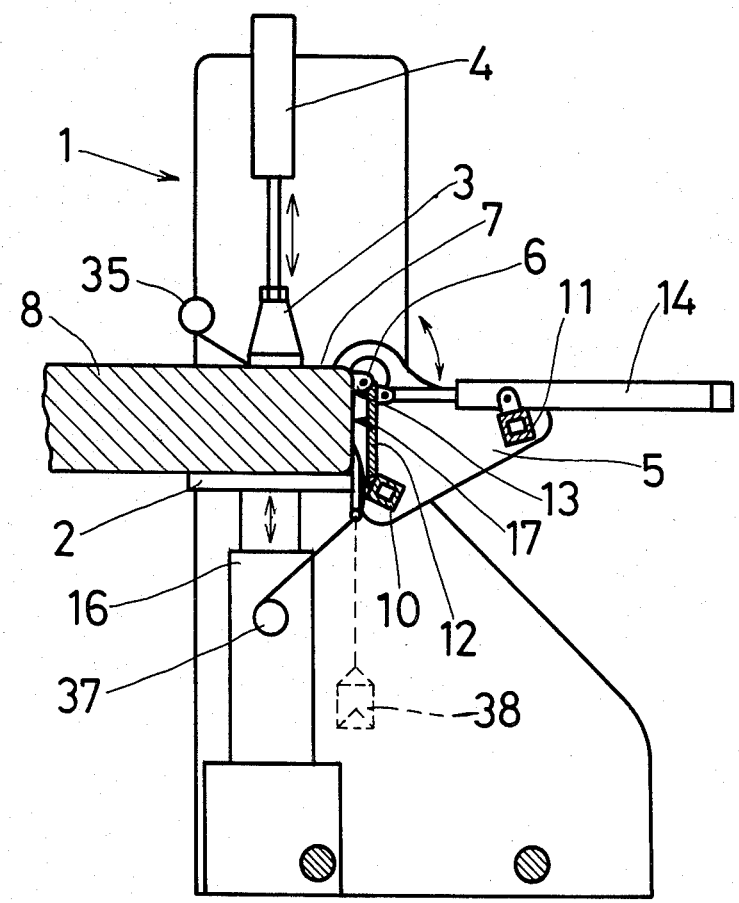
FIGS. 4 and 5 are similar to FIGS. 2 and 3 respectively but illustrating an added feature.
Figure 5:
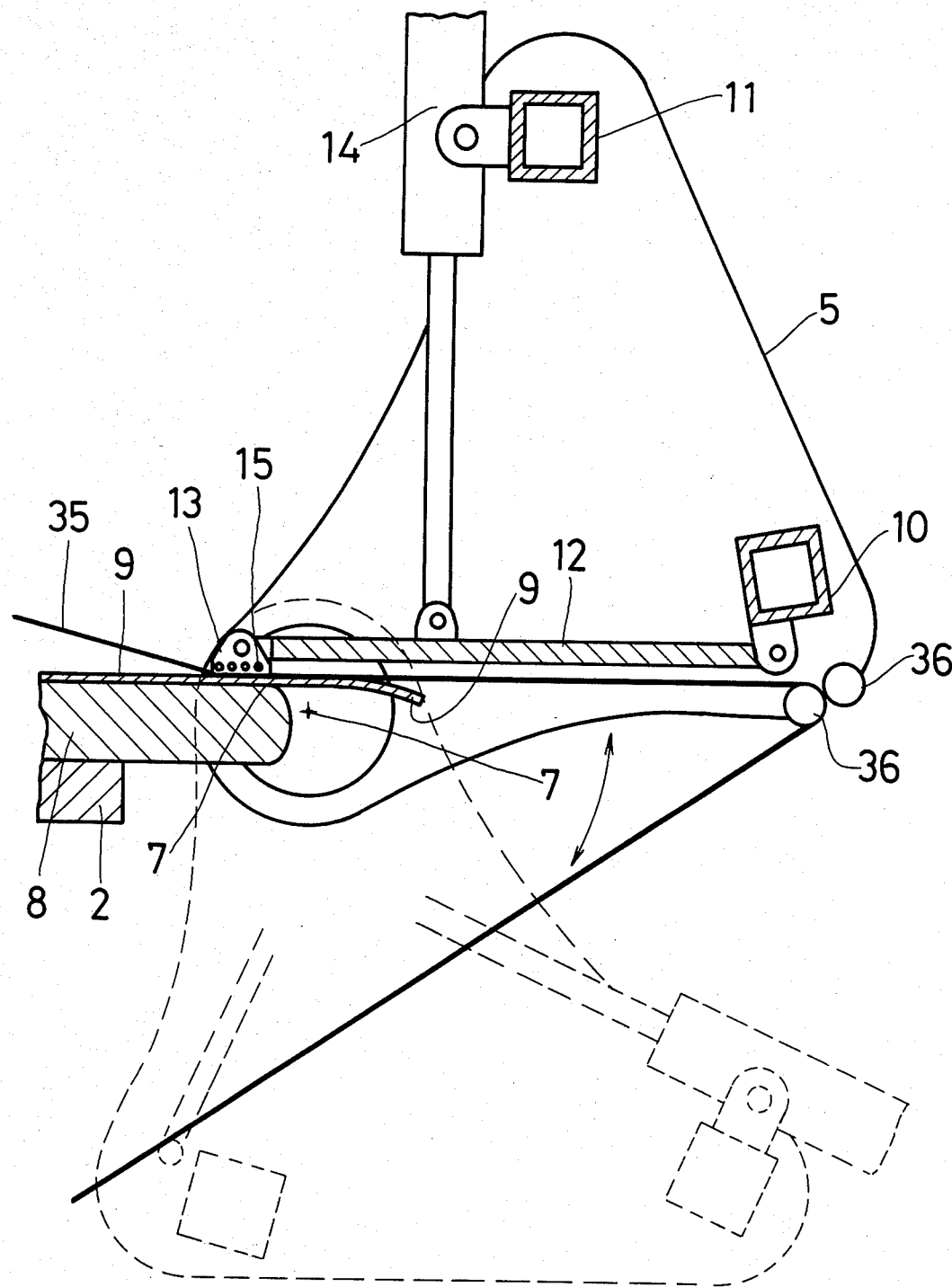

The apparatus illustrated in FIGS. 1 to 3 and 4 and 5 are substantially identical but, in the embodiment of FIGS. 4 and 5, the table 2 is mounted to the upper end of a pair of supporting piston and cylinder assemblies 16 which can be either hydraulic or pneumatic as may be required. The table 2 may be adjusted in height and the clamp 3 operates against the piston and cylinder assemblies 16. Thus, by increasing the pressure in the piston and cylinder assemblies which support the table, the whole clamp arrangement and panel 8 can be moved upwardly and downwardly relative to the applicator bar 13. This arrangement has a tremendous advantage where extremely thick panels or other arrangements having a high front face are to be surfaced using the sheet materials under consideration.

In use, a panel, such as a chip board door, for example, is firstly provided with radiused edges by means of suitable cutters in known manner. Generally, only the two major longitudinal edges of a door would be covered with a sheet of surfacing material as well as at least the outer major face thereof.

In order to form a door of this nature a sheet of known incompletely cured thermosetting resin surfacing material is bonded to the major surface of the door and the surfacing sheet is allowed to project beyond the edge 7 of the door.

With the surfacing sheet in this condition the door or panel is clamped to the table of the above described apparatus with the edge of the door projecting over the table edge but substantially parallel thereto.

Generally speaking the above arrangement would be such that the surfacing sheet would be uppermost and, in such a case, the end supports for the applicator bar assembly are located in a position in which the applicator bar can be engaged properly with such upper surface immediately adjacent the radiused edge of the door or panel.

The pneumatic cylinders 14 associated with the applicator bar are activated and the applicator bar is thereby urged against the surfacing sheet to move it into intimate contact with the surface of the door. The arm arrangement is sufficiently flexible to twist or bend to accommodate misalignment or other non-conformities.

If the end supports are then rotated in a direction such that the applicator bar moves away from the major portion of the door or panel itself it will be drawn, whilst engaging the surfacing sheet around the edge, thereby tending to stretch the sheet somewhat towards the projecting edge thereof. As the applicator bar reaches the radiused edge it will continue to urge, by reason of the presence of the pneumatic piston and cylinder assemblies, the surfacing sheet into intimate contact with the radiused edge of the door or panel. Being hingedly mounted, the applicator bar will assume a position in which it contacts the longest surface area in the region being treated.

It will be understood that, for surfacing sheets which require heat in order for its application to be effective, the resistance heating element in the applicator bar will be activated during the above described process. The process is thus carried out at a speed sufficiently slow to enable adequate heat transfer from the applicator bar to the surfacing sheet material to take place without the sheet material being overheated but, with the sheet material being heated to an optimum extent. As indicated above, it has been found that by using apparatus according to this invention a smaller radius of curvature can be achieved in the bend of the surfacing sheet around a radiused edge of a door or panel as well as a full 180 degree bend arrangement can be produced to fold the surfacing sheet completely around a projecting radiused edge of a door.

During this process the arm arrangement which is located basically on the side of the pneumatic piston and cylinders opposite the door edge, prevents unwanted lateral movement of the applicator bar.

The movement of the applicator bar 13 may be controlled further. Thus, adjacent each of the edges, the bar can be held stationery relative to the surfacing sheet to ensure that proper adhesion is achieved in the regions immediately adjacent a radiused part thereof.

The applicator bar can then be moved around the radiused edge and again held stationary relative to a vertical front face 17 of a thick panel (see FIG. 4) or the like again immediately adjacent the radiused corner. This ensures that the surfacing sheet is properly adhered to the panel or the like immediately adjacent the radiused corners. At this stage, in the case of the embodiment of FIGS. 4 and 5, the table 2 can be moved upwardly so that the surfacing sheet is applied to the rather high front face of the panel and, when the applicator bar is adjacent the lowermost radiused edge, the table may be stopped and the end supports 5 can be further rotated to cause the applicator to apply the surfacing sheet to a lower radiused corner. Again the applicator bar can be stopped for a predetermined period of time at both sides of the radiused edge to ensure proper adhesion.

The apparatus according to this invention has a highly desirable effect in that the surfacing sheet is almost stretched onto the surface of the panel or the like so that no regions of the surfacing sheet remain out of contact with the surface to which it is bonded.

The contact heating of the sheet material in the areas and zones where the heat is required at any one time has been found to be highly advantageous when compared to the prior art preheating method followed by application.

Figure 6:
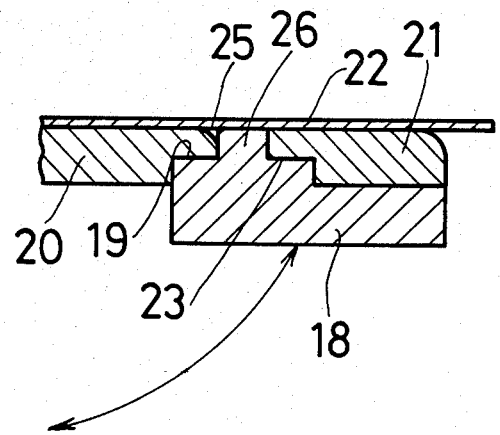
FIGS. 6 and 7 illustrate, in schematic end view, a particular variation of the use of the apparatus.
Figure 7:
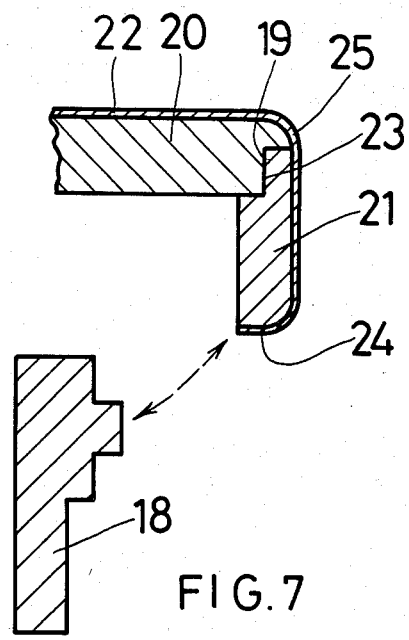

Turning now to the variation of the invention shown in FIGS. 6 and 7 the device is substantially the same apart from the introduction of a jig member 18 which is shaped to co-operate with a rebated end 19 of a door or desk top panel 20 or the like. An edging strip 21 is located by the jig member 18 in proper spaced relationship relative to the panel 20 and a surfacing sheet 22 which has been applied to the surface of the panel projects over the edging strip 21. The edging strip also has a rebated edge 23 so that, when it is rotated about 90°, it will co-operate properly with the rebated end of the panel. The final position of the edging strip 21 and panel 20 is illustrated in FIG. 7.

The outer surfaces of the rebated end and the lower edge 24 of the edging strip are radiused and, after the surfacing sheet 22 has been secured to the edging strip, the jig member 18 can be swung out of the way, it being suitably mounted to do this.

The apparatus described above with reference to FIGS. 1 to 5 can then be used in the normal way and the applicator bar will initially engage the surfacing sheet 22 where it is bonded to the surface of the door panel adjacent its radiused edge 25. The jig member defines a space 26 of the surfacing sheet between the edging strip and the panel so that this region can become bonded to the radiused edge 25 of the door panel. In its initial position of engagement the applicator bar engages the edge of the panel and, if it is not too wide, extends over the surfacing sheet between the panel and over the part of the surfacing sheet covering the edging strip. The applicator bar remains in this position for long enough to effect the required heating and bonding of the surfacing sheet to the edging strip and then starts to move laterally around the radiused edge of the door.

The edging strip, which has been released in consequence of the jig moving to an inoperative position, moves into its proper position in which the rebates 19 and 23 co-operate. Suitable adhesive is used, or preapplied to the co-operating surfaces of the rebates so that the edging strip becomes bonded into its final position as illustrated in FIG. 7. The applicator bar moves to permanently bond the surfacing sheet to any rather enlarged vertical surface of the edge of the panel where the edging strip was too wide to be covered by the applicator bar initially, and thereafter around the lower radiused edge 19 of the edging strip.

In order to achieve this the vertically movable table 2 can be employed if the height of the edging strip is sufficiently great to warrant it. Otherwise the table can be held stationary while the applicator bar heats and applies the surfacing sheet.

Figure 8:
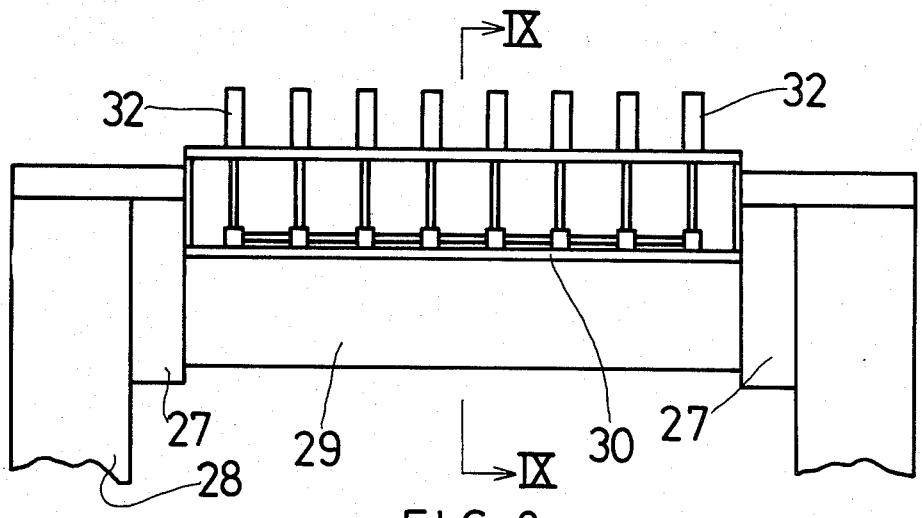
FIG. 8 is a schematic front elevation of apparatus having rotatable mounts for a column or the like; and, FIG. 9 is a sectional view taken along line IX—IX in FIG. 8.
Figure 9:
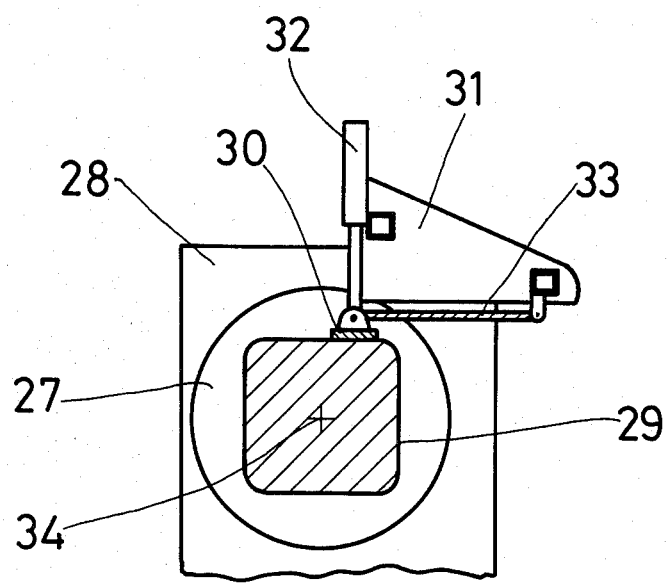

In the event that a surfacing sheet is to be applied to a column or the like, whether it be of circular or non-circular cross-section, the end supports need not necessarily be employed or, alternatively, if they are present they could be held stationary and the column rotated by an arrangement as illustrated in FIGS. 8 and 9.

To this end, the apparatus can comprise a pair of rotatable mounting assemblies 27 supported on the main support 2 of apparatus according to this invention and the mounting assemblies can be axially retractable so as to grip a column 29 end-on therebetween. In this case, the applicator bar 30 is again urged towards the surface of a column 29 held by the rotatable mounting assemblies 27 and the end supports 31 can be held stationary or, alternatively, can be fixed relative to the frame 28 of the apparatus.

Similar pneumatic piston and cylinder assemblies 32 are employed for urging the applicator bar 30 towards the surface of the column 29 and lateral restraining arms 33 are again provided, conveniently in the form of a plate as outlined above.

If required, and depending on the size range of columns to be treated by apparatus as described above, the end supports 31 could be made movable in a direction towards and away from the axis 34 of rotation of the rotatable mounting assemblies 27 or, alternatively, the axis of the mounting assemblies could be made movable relative to the end supports. In either event the size ranges which can be accommodated by the apparatus is determined by this type of adjustment or movement.

Where the surfacing sheet is of a nature such that it is susceptible to damage by the sliding action of the applicator bar thereon a protective sheet can be employed to be located between the surfacing sheet and applicator bar.

To this end, on the side of the clamp 3 remote from the end supports, and as shown in FIGS. 4 and 5, a roll of a protective sheet material indicated by numeral 35 may be provided. The sheet material is such that it can be drawn under the clamp 3 so as to be positioned between the clamp and a surfacing sheet 9 being applied.

The protective sheet 35 is passed between a pair of rollers 36 carried by the end supports and extending parallel to the longitudinally extending beams 10 and 11 to which the arm arrangement 12 is mounted. With this arrangement the protective sheet 35 extends roughly parallel to the arm arrangement. The protective sheet, which extends from between the rollers 36, is preferably attached to a take-up roller 37 carried by the frame and located beneath the table 2. Alternatively a weight 38 (shown in dotted lines) could be attached to the free end and the weight could be moved along the length of the protective sheet as and when required.

It will be understood that with the protective sheet, which may be Kraft paper, plastic foil or the like, the surface of the surfacing sheet will not be damaged in any way as a result of the applicator bar being drawn laterally across the sheet while being urged towards it. It must be noted that the protective sheet must be sufficiently heat conductive where the applicator bar is of the heated type so as to avoid unnecessary heat losses or inadequate heating of adhesive.

It will be understood that the above described embodiment of the invention can be varied in many ways without departing from the scope of this invention. In particular, the applicator bar, which is in these embodiments of the invention a flat bar, could be replaced by a bar having a right-angled section so that, as the material is folded about the radiused corner of a panel, the two surfaces joined by the corner can be pressed into engagement with the surfaces of the door or panel simultaneously for a short while. This may not be necessary in most cases.

Furthermore, the exact arrangement whereby the applicator bar is mounted to the apparatus can be varied widely and the arrangement described above could be varied in many ways involving only structural changes, but none in principle. The rather multitudinous pneumatic piston and cylinder assemblies could be decreased in number or replaced with mechanical or other forms of urging or biasing the applicator bar such as a leaf spring arrangement, for example.

What I claim as new and desire to secure by Letters Patent is:

1. Apparatus for applying sheet material around an edge or corner of a carrier member, said apparatus comprising a frame, a support arrangement for the carrier member for supporting it in a predetermined position, a pair of end supports rotatable in unison, a pair of laterally offset primary frame members extending between and attached to the two end supports, an applicator bar extending along the required length of the support arrangement, means carried by one of said primary frame members for urging the applicator bar towards the surface of a carrier member supported by the apparatus, and away from said primary frame member, means for causing rotation of said end supports which causes lateral movement of the applicator bar relative to said surface while remaining in contact therewith, and lateral restraining means carried by the other primary frame member for inhibiting uncontrolled or undesired lateral movement of the applicator bar.

2. Apparatus as claimed in claim 1 in which the applicator bar embodies heating means for selectively heating the bar as required.

3. Apparatus as claimed in claim 1 in which the urging means comprises a series of individual biasing arrangements spaced apart along the length of the applicator bar.

4. Apparatus as claimed in claim 3 in which the urging means are composed of a plurality of pneumatic or hydraulic piston and cylinder assemblies.

5. Apparatus as claimed in claim 1 in which the lateral restraining means is an arm arrangement extending transverse to the direction of urging of the applicator bar.

6. Apparatus as claimed in claim 1 in which the support arrangement is a table and clamping member co-operating therewith.

7. Apparatus as claimed in claim 1 in which the applicator bar is hingedly mounted relative to said urging means.

8. Apparatus as claimed in claim 1 in which the applicator bar is substantially flat.

* * * * *